United States Patent [19]

De Rocher et al.

[11] Patent Number: 5,027,628
[45] Date of Patent: Jul. 2, 1991

[54] LOCKABLE QUICK-RELEASE MECHANISM

[75] Inventors: Etienne De Rocher; Michael Green, both of Oakland, Calif.

[73] Assignee: Omnilock Incorporated, Berkeley, Calif.

[21] Appl. No.: 515,470

[22] Filed: Apr. 27, 1990

[51] Int. Cl.[5] .............................................. E05B 71/00
[52] U.S. Cl. ........................................ 70/233; 70/225
[58] Field of Search ................. 70/233, 225, 226, 227, 70/259, 181; 301/111, 114, 124 R, 125

[56] References Cited

U.S. PATENT DOCUMENTS

| | | | |
|---|---|---|---|
| 4,028,915 | 6/1977 | Stahl | 70/233 |
| 4,114,409 | 9/1978 | Scire | 70/225 |
| 4,621,873 | 11/1986 | Weinstein | 301/124 R |
| 4,724,692 | 2/1988 | Turin | 70/225 |
| 4,770,011 | 9/1988 | Constant | 70/225 |
| 4,964,287 | 10/1990 | Gaul | 70/233 |

Primary Examiner—Robert L. Wolfe
Attorney, Agent, or Firm—Townsend & Townsend

[57] ABSTRACT

A lockable quick-release mechanism for preventing theft of a bicycle wheel or seat from a bicycle frame. The lockable quick-release mechanism includes a rotatable lever having an eccentric cam rotating within a piston head. As the eccentric cam rotates within the casing, the piston head moves in relation to the casing. For tightening, the piston head is brought from its outermost to innermost position relative to its casing. Conversely, for loosening, the piston head is brought from its innermost to outermost position relative to its casing. Flat abutment surfaces are formed on the lever adjacent to the eccentric cam. A locking disc is disposed within the casing and includes a pair of extension arms engaging the abutment surfaces to prevent rotation of the lever. A spindle, which is disposed within the casing and extends through an aperture in the locking disc, rotates the locking disc from a locked to an unlocked condition. The spindle and locking disc are retained in the locked condition by a lock means.

16 Claims, 4 Drawing Sheets

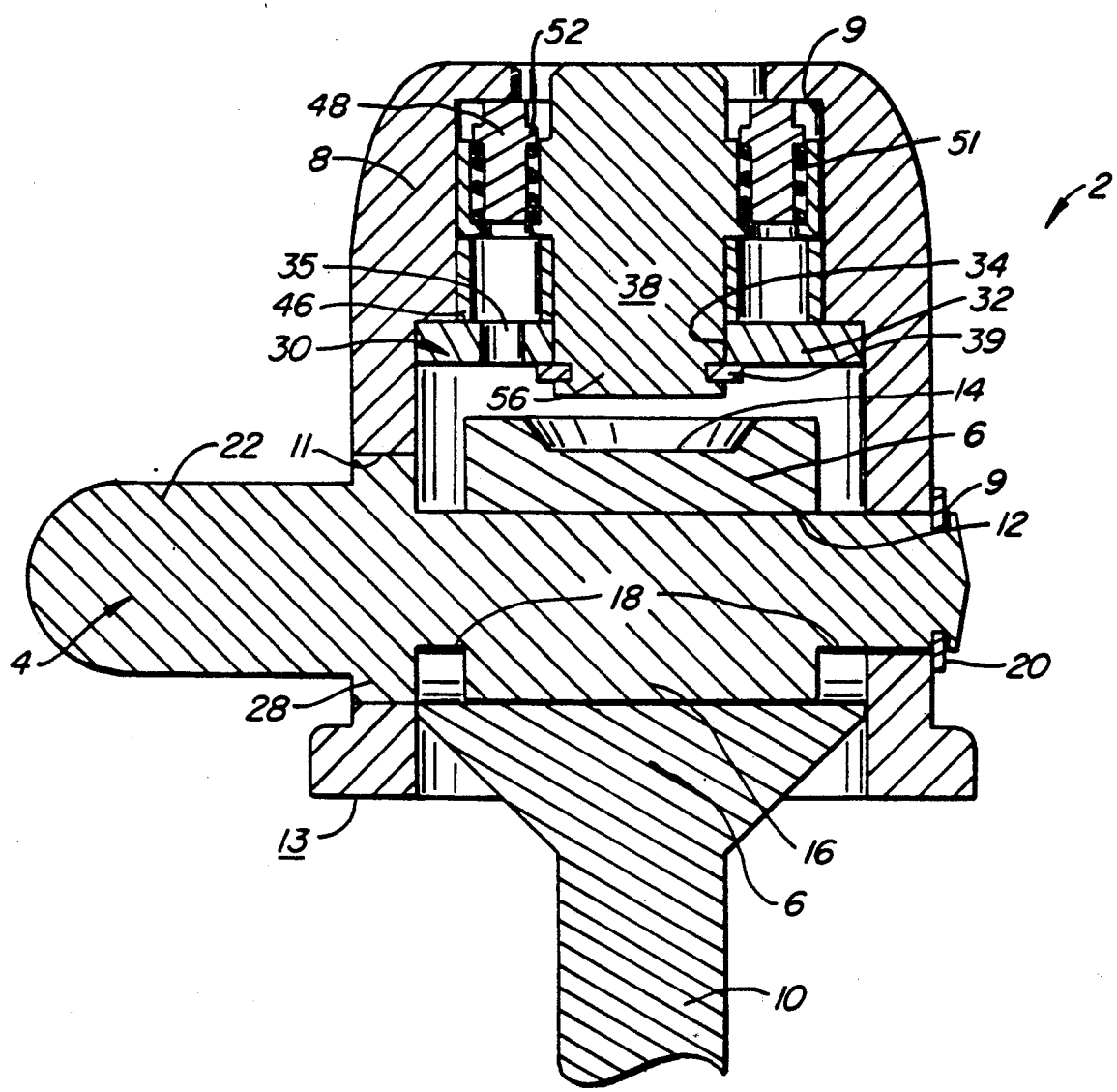
FIG._1.

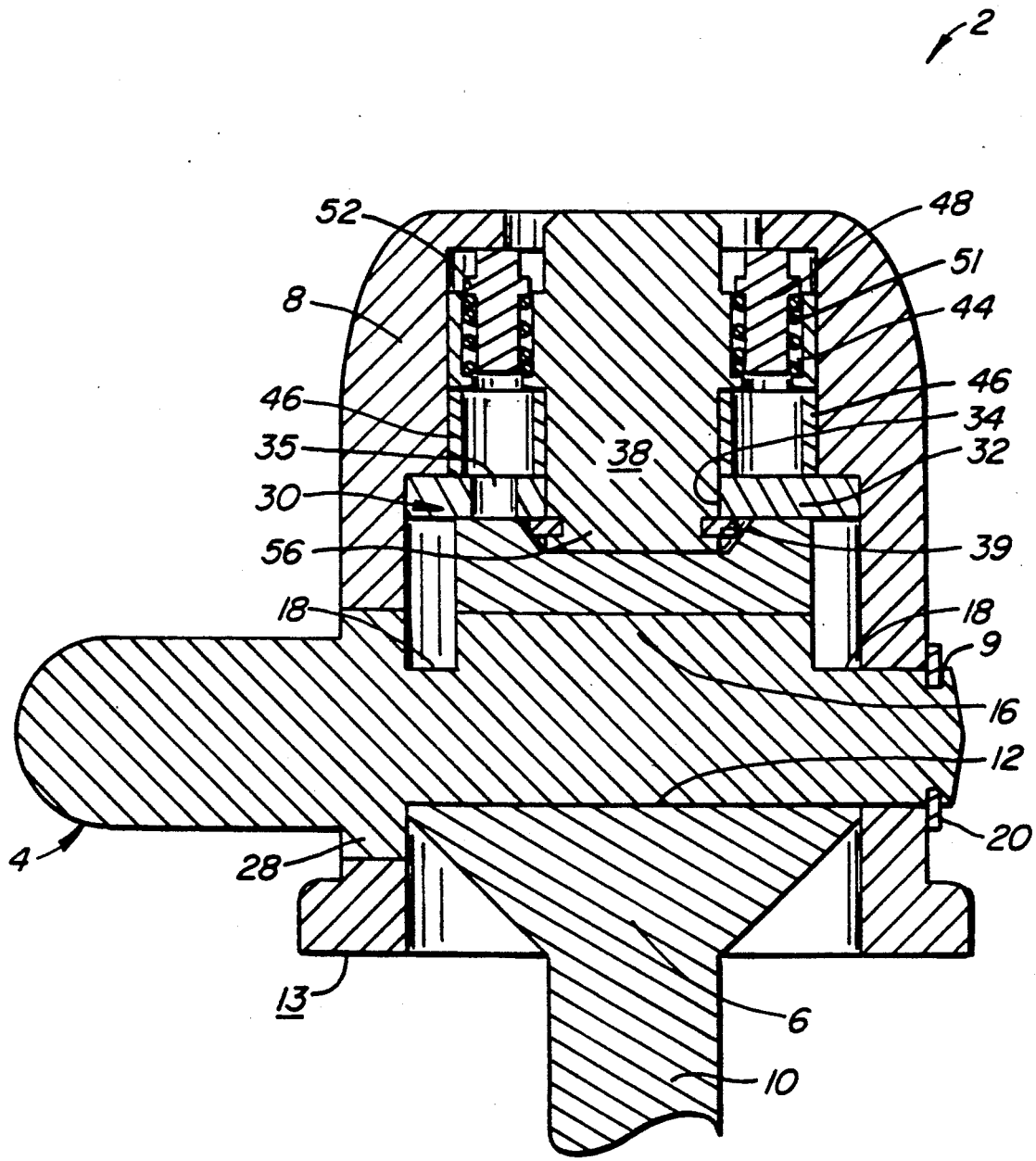
FIG._2.

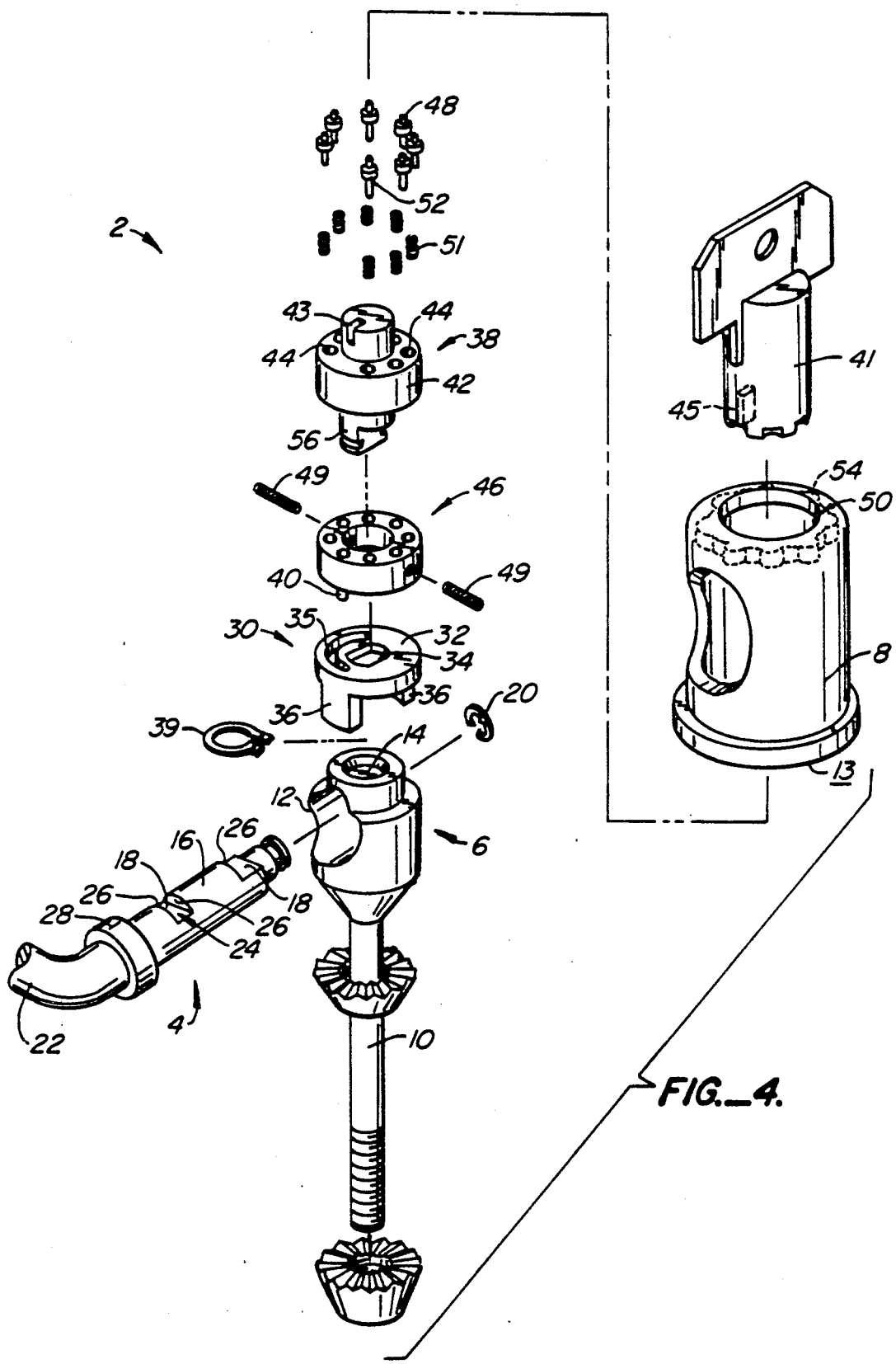
FIG._4.

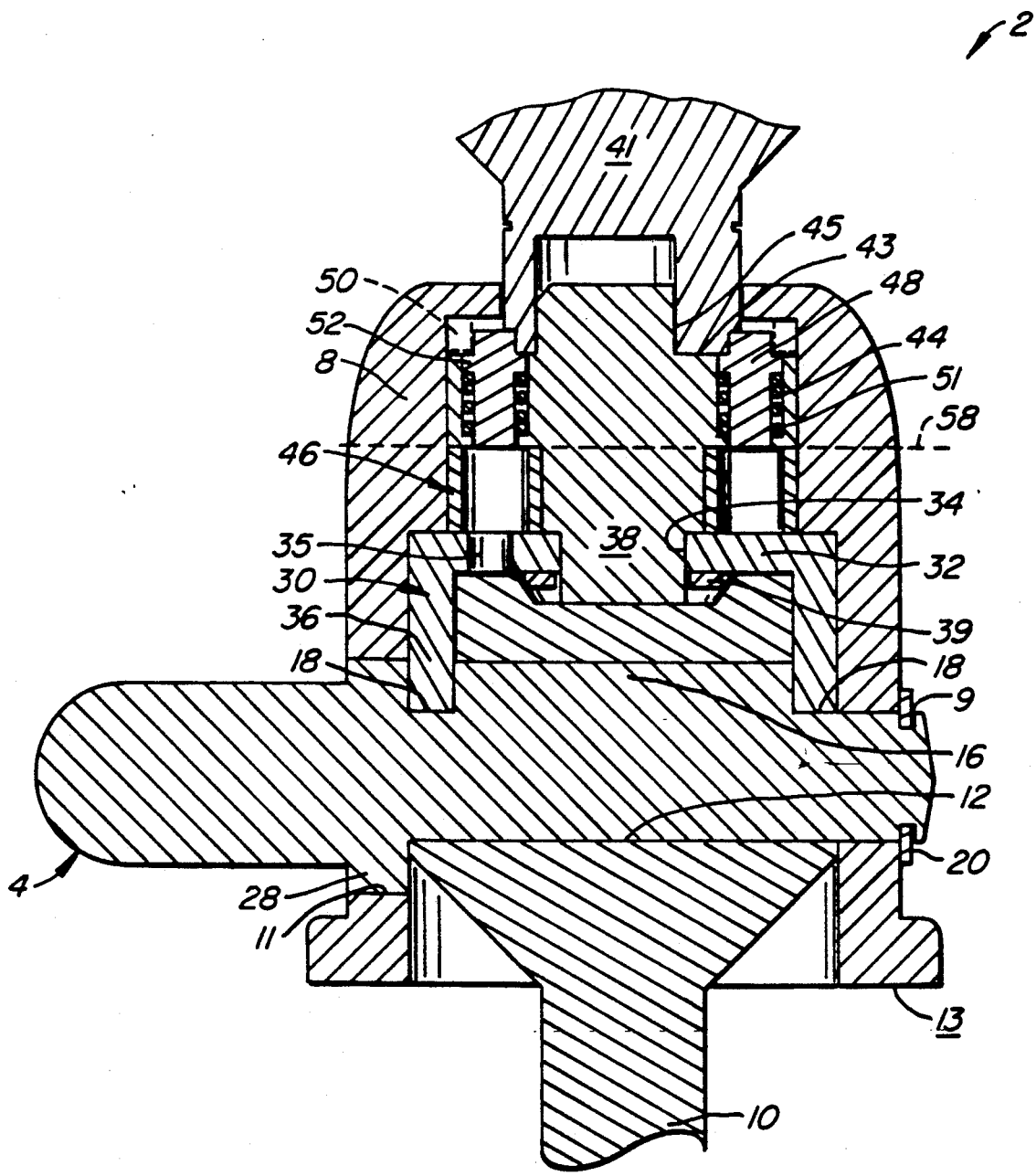
FIG._3.

LOCKABLE QUICK-RELEASE MECHANISM

BACKGROUND OF THE INVENTION

The present invention relates to a lockable quick-release mechanism for securing removable parts, in particular a wheel or seat to a bicycle frame, so as to prevent theft.

Bicycles manufactured and sold today commonly employ traditional quick-release mechanisms for easily attaching, detaching and adjusting desired components for connection to the bicycle frame. These components may include the wheels and seat. Typically, a lever having a cam is rotated within a piston head disposed on the end of an axle for selectively tightening and loosening the component. Such quick-release mechanisms prove extremely useful when repairing flat tires, adjusting seat height, and for transporting the cycles, for example, in cars. However, accidents may occur from inadvertent loosening of the traditional quick-release mechanism resulting in injury to the cyclist or damage to the bicycle. Additionally, traditional quick-release mechanisms, by the very nature of their ease of removal, actually facilitate theft of the expensive components held to the frame.

Therefore, several cumbersome methods are currently employed for securing the bicycle and its removable components. A first securing method employs two U-locks and one cable. One U-lock is secured around one wheel, the frame, and an immovable object. The other U-lock secures the other wheel to the bicycle frame. A cable attached to either of the U-locks and the seat secures the seat. The entire bicycle is thus anchored to a fixed structure to prevent theft of the bicycle or its component parts. The difficulty of carrying and the cost in procuring these two U-locks and cable make this method undesirable. A second securing method employing multiple independent locks requires removal of the front wheel from the frame. The front wheel is then placed side by side with the rear wheel. A single U-lock is placed around both wheels, the frame and a fixed structure. Furthermore, a cable attached to the seat prevents theft of the seat. Removal of the front wheel results in the front fork resting on the ground. This practice is likely to cause deformation or damage to the fork, resulting in unsafe riding practices and expensive bicycle repairs. The above first and second methods of securing bicycles are also undesirable because of additional weight due to carrying each of the locks and because of and the considerable locking time involved. A third alternative is to employ only one lock securing the frame to a stationary structure. Although locking time and carrying weight is minimal, there is a likelihood that the seat and/or wheels will be stolen. Therefore, because none of these securing methods is effective or practical, it has become necessary to develop a lockable quick-release mechanism to overcome the problems discussed above. U.S. Pat. No. 4,028,915 to Stahl, U.S. Pat. No. 4,114,409 to Scire and U.S. Pat. No. 4,621,873 to Weinstein et al. each disclose a lock for a quick release mechanism. However, none of these mechanisms is commercially practical, as is the present invention.

SUMMARY OF THE INVENTION

The present invention relates to a lockable quick-release locking mechanism for securing a wheel or seat to a bicycle frame so as to prevent theft of these removable components.

As is typical of traditional quick-release mechanisms, a lever including a cam is rotated approximately 180° within a piston head for selectively tightening and loosening the wheel or seat. For tightening, the piston head is brought from its outermost to innermost position relative to its casing. Conversely, for loosening, the piston head is brought from its innermost to outermost position relative to its casing. In practice, the piston head actually remains stationary on the end of its axle and the casing moves relative to the piston head. It is an object of the present invention to prevent the above-described motions, thereby creating a lockable quick-release mechanism which is cost efficient, lightweight to carry, and quick and easy to use.

In the preferred embodiment, a casing axially surrounds the piston head. The lever extends rotatably through the piston head in a horizontal direction relative to the axial direction of the casing such that when the lever is rotated in one direction the piston head is brought from its outermost to innermost position relative to its casing. Similarly, when the lever is rotated in the opposite direction, the piston head is brought from its innermost to outermost position relative to its casing.

A flat abutment surface may be formed on or within the lever adjacent to the eccentric cam for engagement with a locking disc. The locking disc preferably includes a generally planar portion having extension arms projecting proximally therefrom. The extension arms abut the flat surfaces of the lever when the present invention is in the closed, locked condition. The flat surfaces on the lever may engage the extension arms only when the quick-release portion of the present invention is in its closed position. Thus, the mechanism cannot be locked in tne open position.

A spindle, whose rotation is controlled by a lock means, is connected for joint movement with the locking disc so that rotation of the locking disc can be effected only upon rotation of the spindle. In the locked condition, the lower surface of the extension arms and the flat abutment surfaces engage each other such that the lever cannot be rotated while the extension arms engage the abutment surfaces.

The cooperating configuration of the spindle, locking disc and locking means ensures the security of components retained by the lockable quick-release mechanism. The present invention, therefore, provides a lightweight, small, lockable quick-release which prevents theft.

BRIEF DESCRIPTION OF THE DRAWINGS

FIG. 1 is a cross-sectional view of the quickrelease locking mechanism shown in its open and unlocked condition;

FIG. 2 is a cross-sectional view of the present invention shown in its closed and unlocked condition;

FIG. 3 is a cross-sectional view of the present invention shown in its closed and locked condition;

FIG. 4 is an exploded view of the present invention.

DESCRIPTION OF THE PREFERRED EMBODIMENT

Referring now to the drawings, FIGS. 1–4 illustrate the lockable quick-release mechanism 2 as constructed in accordance with the present invention. A lever 4 extends through a piston head 6 for moving casing 8 relative to the piston head so as to secure either a component such as a wheel or seat onto an axle 10 which may reside in any of the following locations: front fork, seat post, rear dropouts of a bicycle frame.

Piston head 6 is formed integrally on the end of axle 10. The piston head tapers from an enlarged end at the distal end of the axle to the normal axle diameter. An opening 12 extends horizontally through piston head 6, perpendicular to the axis of axle 10, for receiving lever 4. A depression 14 is formed in the distal-most end of piston head 6, opposite the junction of the piston head and axle 10.

Lever 4 includes an eccentric cam 16 extending through opening 12 of piston head 6 for rotation therein. Lever 4 is secured in place by retention clip 20, and is rotatable within opening 12 of piston head 6. At the end of lever 4 opposite retention clip 20, a handle 22 serves to rotate lever 4. Turning now to FIG. 4, slots 24 are cut in eccentric cam 16 having sidewalls 26 and flat abutment surfaces 18 formed on the lower surface of the slots. An enlarged portion 28 separates lever 4 from handle 22.

A locking disc 30, as seen most clearly in FIG. 4, includes a generally circular, planar portion 32 having a noncircular (female "Double D") aperture 34 formed at approximately the center of planar portion 32. A crescent-shaped opening 35 is also formed in planar portion 32 and spaced from aperture 34. Extension arms 36 project in a proximal direction from planar portion 32. In the preferred embodiment, a pair of diametrically opposed extension arms 36 engage flat abutment surfaces 18 of slots 24. However, it is within the scope of the present invention to provide any number of extension arms formed in locking disc 30 and cooperating slots 24.

A spindle 38 is disposed distally of piston head 6 within casing 8. A central body 42 of spindle 38 includes openings 44 for receiving tumblers 48, to be described below. The distal end of spindle 38 includes a key slot 43, as seen in FIGS. 3 and 4. Stepped protuberance 56 extends proximally from central body 42 having a noncircular (male "Double D") portion of the same configuration as aperture 34 for mating therewith. Protuberance 56 engages aperture 34 so that spindle 38 moves jointly with locking disc 30. A retention ring 39 retains locking disc 30 onto spindle 38. A distal end of spindle 38, is configured to receive a circular key 41 having key tabs 45, to be described below.

Casing 8 includes a substantially hollow elongated axial opening 28 for receiving parts including spindle 38, locking disc 30, piston head 6, and lever 4. As described above, lever 4 extends horizontally through piston head 6 and casing 8. Retention clip 20 fits within a retaining groove 9 of lever 4 opposite handle 22 for securing lever 9 within casing 8. Groove 9 is positioned between the outer periphery of casing 8 and the end of lever 4 opposite handle 22 when assembled. On the peripheral surface of casing 8 adjacent handle 22, a side opening 11 is sized to receive enlarged portion 28 of lever 4. Casing 8 includes a serrated (not shown) lower surface 13 which applies pressure to the fork blades or seat tube collar, so as to retain the wheel or seat on the bicycle frame. The distal axial end of casing 8 includes an opening for receiving key 41 to move spindle 38 and locking disc 30 between locked and unlocked positions.

A lower cylinder 46 surrounds stepped protuberance 56 of spindle 38, underlying central body 42. The lower cylinder is fixed with respect to casing 8 by retention bolts 49. The configuration of lower cylinder 46 includes a toroidal shape having a plurality of openings in the flat surface which are aligned with openings 44 of spindle 38, each for receiving a tumbler (or pin) 48. Lower cylinder 46 holds spindle 38, tumblers 48, and springs 51 in place. A stop post 40 engages crescent-shaped slot 35 for limiting rotation.

A casing sector ring 50, as best seen in FIGS. 3 and 4, is formed at the distal end of casing 8 axially overlying openings 44. Casing sector ring 50 includes a plurality of sectors 54 formed in its inner periphery for receiving an outwardly protruding portion 52 of each tumbler 48 disposed near the distal ends of the tumblers.

A plurality of tumblers 48 extend proximally into openings 44 of central body 42, in a plane above lower cylinder 46. Each tumbler 48 includes outwardly protruding portion 52 retained in the locked position by sectors 54 of casing sector ring 50.

The operation of lockable quick-release mechanism 2 will now be described. In its initial, open and unlocked condition as seen in FIG. 1, eccentric cam 16 is in its outermost proximal position relative to casing 8. Handle 22 is rotated approximately 180°, as seen in FIG. 2, such that eccentric cam 16 moves casing 8 relative to piston head 6. The piston head is thus in its innermost proximal position in relation to casing 8. Thus, the lower surface 13 of casing 8 applies pressure to the fork blades or the seat tube collar. On the proximal end of axle 10, an end bolt applies pressure to the opposing fork blade or opposing side of the seat tube collar. Thus, the component is secured in position. In the closed position, abutment surfaces 18 face lock disc 30. When the proper key 41 is inserted into the lock, each tumbler 48 is pushed proximally against the bias of a spring, beyond casing sector ring 50, allowing key 41 to rotate, as seen in FIG. 3 in the closed, locked condition.

To lock the lockable quick-release mechanism 2, spindle 38 and locking disc 30 are rotated with key 41 by means of key tab 45. As locking disc 30 rotates approximately 90°, extension arms 36 slide onto abutment surfaces 18, preventing lever 4 from rotating around or from being removed by removal of retention clip 20. The lockable quick-release mechanism is now in the closed and locked position.

In order to unlock the lockable quick-release mechanism, key 41 rotates spindle 38 and locking disc 30 to disengage extension arm 36 from slots 24, thus allowing free movement of lever 4, and, accordingly, piston head 6. Handle 22 may then be rotated to open the lockable quick-release mechanism.

Use of an improper key 41 would not rotate the spindle 38 and locking disc 30, since tumblers 48 pushed down an insufficient amount will not clear casing sector ring 50. Similarly, tumblers pushed down too far will extend beyond the shear line 58, into the lower cylinder, preventing rotation of spindle 38 and locking disc 30

Because abutment surfaces 18 must engage extension arms 36 of locking disc 30 in order to lock quick-release locking mechanism 2, it is impossible to lock the present invention in an open position.

This invention has been described with reference to the preferred embodiment. Modification and variation may be made to the preferred embodiment without departing from the scope of the invention, which is limited only by the following claims. For example: the flat abutment surfaces may be formed as slots having sidewalls as described herein, or as plateaus for engaging the proximal end of the extension arms; the locking disc may have a planar configuration other than circular and any number of extension arms; the retention clip for retaining the lever horizontally within the casing may by replaced by a slot having an indentation in the inner surface of the casing; the lock may be substituted with any lock, either a key lock or combination lock.

It is to be understood that the scope of the present invention is limited only by the following claims.

What is claimed is:

1. A lockable quick-release mechanism for securing a device to a bicycle frame comprising:
   a casing having a substantially hollow elongated axial opening;
   a piston head axially aligned with said axial opening and being movable from an innermost position relative to said casing to an outermost position relative thereto;
   a rotatable lever extending horizontally through said piston head and having an eccentric cam;
   abutment surfaces formed on said eccentric cam;
   a locking disc for engaging said abutment surfaces thereby preventing rotation of said lever and retaining said piston head in said innermost position; and
   lock means for selectively securing said locking disc in engagement with said abutment surfaces to lock the device to the bicycle frame.

2. The lockable quick-release mechanism as defined by claim 1 wherein rotation of said eccentric cam shifts the device toward the bicycle frame.

3. The lockable quick-release mechanism as defined by claim 1 wherein said locking disc comprises a substantially planar portion disposed adjacent to said eccentric cam and includes an extension arm projecting toward said abutment surfaces.

4. The lockable quick-release mechanism as defined by claim 1 wherein said locking disc comprises a substantially planar circular portion and a pair of extension arms diametrically opposed to each other and projecting from said planar portion toward said abutment surfaces.

5. The lockable quick-release mechanism as defined by claim 4 wherein said abutment surfaces include flat surfaces and wherein said extension arms engage said abutment surfaces to thereby prevent rotation of said lever.

6. The lockable quick-release mechanism as defined by claim 5 wherein said flat surfaces comprise slots formed in said eccentric cam.

7. The lockable quick-release mechanism as defined by claim 1 wherein said locking disc includes an aperture and wherein said lockable quick-release mechanism further comprises a spindle disposed coaxially within said axial opening and engaging said aperture for rotating said locking disc from a locked to an unlocked condition.

8. The lockable quick-release mechanism as defined by claim 7 wherein said spindle is rotatably disposed within said hollow casing.

9. The lockable quick-release mechanism as defined by claim 7 wherein said piston head includes an depression adapted to receive a proximal end of said spindle.

10. The lockable quick-release mechanism as defined by claim 9 wherein said depression is aligned with said aperture.

11. The lockable quick-release mechanism as defined by claim 7 wherein said lock means engages said spindle to prevent rotation of said locking disc.

12. The lockable quick-release mechanism as defined by claim 7 comprising means for limiting movement of said lock means.

13. The lockable quick-release mechanism as defined by claim 1 wherein said lock comprises a key lock.

14. The lockable quick-release mechanism as defined by claim 1 further comprising means for retaining said lever rotatably within said casing.

15. The lockable quick-release mechanism as defined by claim 1 wherein said piston head is tapered.

16. A lockable quick-release mechanism for retaining a device on a bicycle frame comprising:
   a casing having a substantially hollow axial opening;
   a piston head disposed within said axial opening at a proximal end of said casing and being movable from an outermost open condition to an innermost closed condition in relation to said casing;
   a lever extending horizontally through said piston head, being rotatable therein and having an eccentric cam for shifting the position of said casing relative to the bicycle frame;
   flat abutment surfaces formed integrally with said lever adjacent to said eccentric cam;
   a locking disc disposed within said casing distally of said piston head, having a substantially planar portion including a central aperture formed in said planar portion and extension arms projecting from said planar portion in the proximal direction toward said flat abutment surfaces, said extension arms engaging said flat abutment surfaces in the closed condition for preventing rotation of said lever;
   a spindle coaxially disposed within said axial opening of said casing and extending through said aperture for rotating said locking disc from a locked to an unlocked condition; and
   a lock means for selectively securing said locking disc in engagement with said abutment surfaces to lock the device to the bicycle frame.

* * * * *